United States Patent
Fuchs

[11] 3,922,914
[45] Dec. 2, 1975

[54] BED LEVEL MONITOR
[75] Inventor: Walter Fuchs, Pittsburgh, Pa.
[73] Assignee: The United States of America as represented by the Secretary of the Interior, Washington, D.C.
[22] Filed: Sept. 18, 1974
[21] Appl. No.: 507,099

[52] U.S. Cl. .............................. 73/290 R; 324/58.5
[51] Int. Cl.² ........................................ G01F 23/28
[58] Field of Search ................... 73/290 R, 304 R; 324/58.5 B

[56] References Cited
UNITED STATES PATENTS

| | | | |
|---|---|---|---|
| 3,296,862 | 1/1967 | Ziniuk | 73/290 R |
| 3,424,002 | 1/1969 | Johnson | 73/290 R |
| 3,474,337 | 10/1969 | Petrick | 73/290 R X |
| 3,695,107 | 10/1972 | Hertz et al. | 73/290 R |
| 3,703,829 | 11/1972 | Dougherty | 73/290 R |
| 3,812,422 | 5/1974 | DeCarolis | 73/290 R X |
| 3,832,900 | 9/1974 | Ross | 73/290 R |
| 3,853,005 | 12/1974 | Schendel | 73/290 R |

Primary Examiner—Jerry W. Myracle
Assistant Examiner—Joseph W. Roskos
Attorney, Agent, or Firm—Gersten Sadowsky; Donald R. Fraser

[57] ABSTRACT

An apparatus for determining the level of fluid in a vessel having a delay line formed in the vessel responsive to pulses derived from a source. In response to pulses from the source reaching the level of the material in the vessel, the pulse is reflected due to the change in characteristic impedance of the delay line. The propagation time of the pulse is a measure of the level of the fluid.

2 Claims, 8 Drawing Figures

BED LEVEL MONITOR

BACKGROUND OF THE INVENTION

The invention relates generally to level measuring and testing utilizing an immersible electrode.

Most commercially available systems for monitoring bed levels in chemical reactors or storage bins have the drawback that their calibration is based on specific properties of the bed that are often difficult, if not impossible, to determine.

Measuring levels of fluidized or moving beds is usually a cumbersome affair. At high pressure or high temperature, most conventional means are not reliable and may fail altogether.

The most common approach is to measure the differential pressure between gas injection probes. The gas must be injected continuously, and the bed level can be determined exactly only when it passes one of the probes. If the level is between probes, its location can be estimated by extrapolation. This requires additional assumptions about the bed density.

Other methods for continuous bed-level determination call for exact knowledge of physical properties of the bed material. For example, the radiation absorption method depends on the absorptivity of the bed, which in turn is a combination of bed density, particle size and shape, and the absorption coefficient of the bulk material. Further, the wall thickness of a high-pressure reactor may obscure all absorption effects.

Some procedures for measuring levels in reactors or containers utilize electric properties of the bed material such as conductivity or permissivity. But even if these properties are known, bed density and particle size very strongly influence the results.

Specific prior art articles are, for example, "Cable Testing With Time-Domain Reflectometry," Hewlett-Packard Co., Palo Alto, Calif., Applications Note 76, 1965, "Time-Domain Reflectometry Measurements," Strickland, J. A., Tektronix, Inc., Beaverton, Ore., 1970, and "Measuring Liquid Level with Time-Domain Reflectometry," by Cruz, J. E. et al., Advances in Cryogenic Engineering, Vol. 18, pages 323–327, 1973.

SUMMARY OF THE INVENTION

The following is a description of an apparatus and method which do not have such shortcomings. This invention provides for the continuous monitoring of the levels of any type of bed (liquid, granular, moving, fluid or fixed) using the technique of time-domain reflectometry (TDR).

The method involves measuring the transit time of an electromagnetic pulse as it travels down an electrode inside the vessel and is partially reflected by the surface of the bed. The principal novel feature of our invention is that propagation velocity of an electrical signal in a gas is the basis for measurement, which makes calibration very reliable and stable. An additional advantage is the simplicity of the probe system inside the reactor.

With my new approach to bed-level measurement, none of the properties of the bed or bulk material are used as a calibration standard. Although the dielectric constant of the bed is used to trigger a signal, the quantitative level determination is derived from the propagation velocity of an electric pulse in the empty (or gas filled) vessel.

As a result, it is a primary object of this invention to provide a method and system capable of monitoring the level of a fluid bed.

A further object is to provide a method and system in which the measurable fluid bed includes gasses, liquids, and fluent solids or combinations thereof.

A still further object is to provide a system having a single conductor in the interior of a vessel capable of monitoring a fluid level at any temperature or pressure.

Other objects and purposes of this invention will be apparent to persons acquainted with apparatus of this type after reading the following specification and inspecting the accompanying drawings.

BRIEF DESCRIPTION OF THE DRAWINGS

Practical techniques and apparatus for utilizing my invention will be more thoroughly understood by reference to the accompanying drawings in which.

DESCRIPTION OF THE PREFERRED EMBODIMENT

Figure 1:
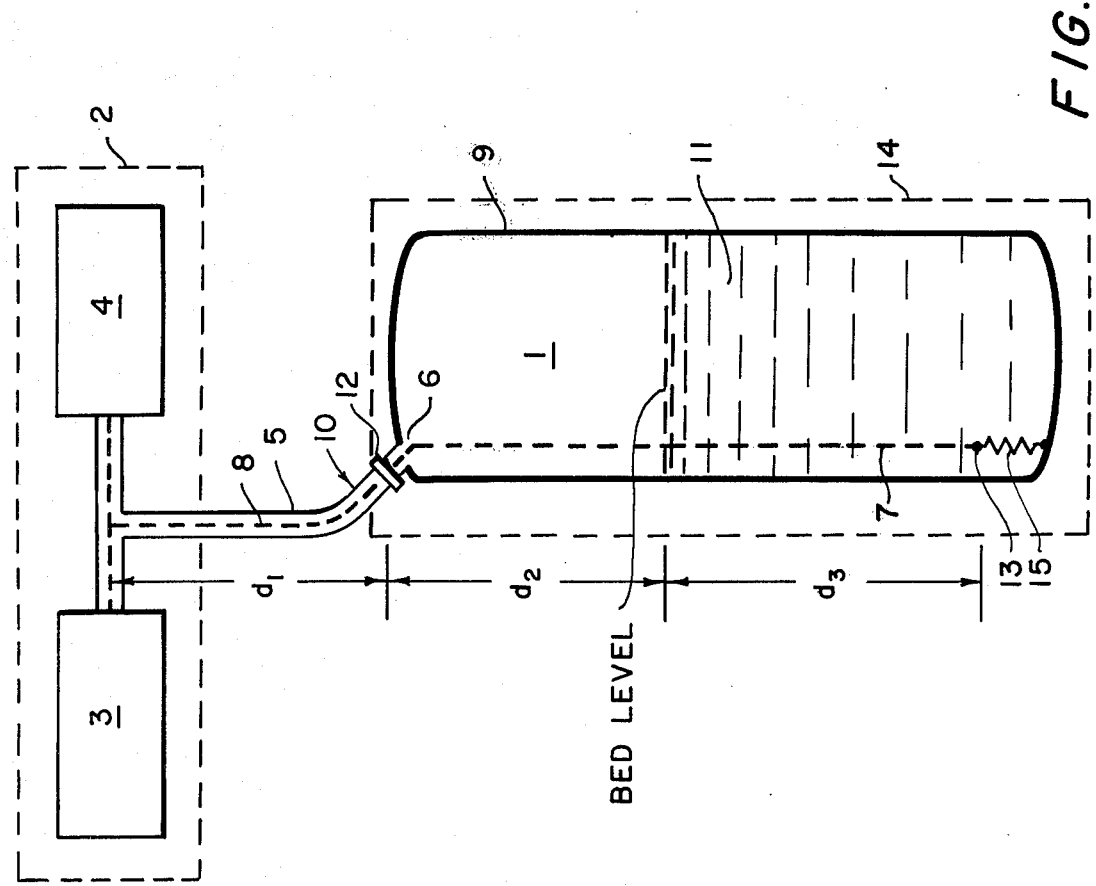
FIG. 1 comprises a generalized, schematic sketch of my invention.

Referring now to FIG. 1, there is shown schematically the application of a level indicator apparatus for fluid-bed reactor or vessel. A fluid-bed reactor may contain a bed of granular particles maintained in a fluidized suspension by the action of air or other gases. One application for the concept of my invention may be for the continuous monitoring of bed levels in a movingbed stage of a coal hydrogasification reactor such as at the U.S. Bureau of Mines facility in Bruceton, Pennsylvania.

There is also provided, a time-domain reflectometry (TDR) unit 2. One example of a TDR unit 2 which may be used in the practice of my invention is a Tektronix 1501 which is available commercially from Tektronix Inc. The TDR unit 2 comprises a pulse generator 3, a pulse detector 4, and a coaxial cable 5. The TDR unit 2 of this invention can generate two types of signals—a step function, and a short impulse that approximates a delta function. The impulse mode has the advantage of higher visibility because a sharp peak is more easily recognizable on the oscilloscope screen or strip chart recorder of pulse detector 4.

In a preferred embodiment of this invention, the top end 6 of electrode 7 is connected to the center conductor 8 of a coaxial cable 5 leading to the TDR unit 2. The metal wall 9 of the vessel 1 is grounded and in intimate contact with the ground sheath 10 of the coaxial cable 5. In this example, the cross section of the fluid bed reactor 2 is uniform. The closer the electrode 7 is to the metal wall 9 the stronger the signal will be. Also, disturbing effects of irregularities inside the vessel 1 (e.g. gas probes, thermocouple probes) (not shown) can be neglected if their distance from the electrode 7 is larger than the shortest distance between the electrode 7 and the reactor wall 9. It is preferable, however, to provide sufficient space between the electrode 7 and the reactor wall 9 to permit the bed material 11 to penetrate.

The apparatus of the above described preferred embodiment operates as follows: An electric pulse generated by pulse generator 3 is fed through coaxial cable 5 to electrode 7. The electric pulse then travels along the electrode 7, which extends the entire length of the vessel 1. The electrode 7 together with the grounded metal wall 9 constitutes a transmission line 14. A pulse generator 3, emits a D.C. signal, part of which is received directly by the pulse detector 4. The other portion of the D.C. signal is deflected into the transmission line 14 (electrode 7 and metal wall 9). Reflections occur at all points of discontinuity, e.g., the connection between the connector 12 and the vessel 1, the interface between the gas and the bed material, and the bottom end 13 of the electrode 7.

Since the geometry of the transmission path in the vessel 1 does not change as a function of height, only a change in the dielectric properties of the material between the electrode 7 and the metal wall 9 will cause a reflection. The reflection's magnitude is directly related to the difference in the dielectric properties of the two media. If the dielectric or conductive losses of the bed material are appreciable, the reflection at the lower end of the electrode cannot be observed because of signal dissipation.

Figure 2:
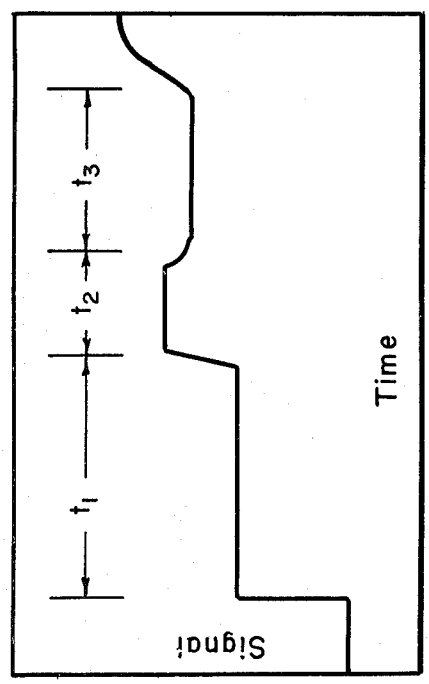
FIG. 2 shows an oscilloscope display for a typical bed measurement.

In FIG. 2 there is shown a schematic representation of an oscilloscope display with a loss-free material in the vessel 1. The signal is assumed to be a square wave having a long duration compared to the transit time, using the step mode of the TDR-unit 2. Thus, the displayed signal represents the reflections of the wave front. The interval $t_1$ is the time delay between the direct signal and the signal reflected from the connection with the vessel 1, i.e. the time necessary for the pulse to travel twice the length of line $d_1$ in FIG. 1. Similarly, the intervals $t_2$ and $t_3$ correspond to the distance $d_2$ and $d_3$. Time interval $t_2$ is the essential piece of data for determining the bed level. Thus, the height of the empty, or rather gas-filled, portion in the vessel 1 is measured. The reflection at the bottom end 13 of the electrode 7 may not always be observable due to dielectric or conductive losses, as mentioned above. But even if no attenuation occurs, the interval $t_3$ cannot be used without complications because the propagation velocity is proportional to the inverse square root of the dielectric constant. For a reliable level determination, it is important that either the propagation velocity of the pulse remains constant or that its change be uniquely predictable.

Since the dielectric constant for most gases differs only slightly from that of a vacuum, the bed-level determination is practically independent of changes in gas composition. For example, if the vessel 1 is operated at 70 atm and 1.000°C and contains a mixture of hydrogen and methane in a varying ratio, the maximum error of the bed-level measurement will be 0.7%. Only in extreme cases, for instance if the gas mixture were to consist of air and acetone, could the error be as large as 10%. The dielectric loss for most gases is negligible.

The dielectric constant of solids is usually several times that of a vacuum. Therefore, one can always expect an adequate discontinuity at the bed's surface, even if the bed density is low, such as with a highly fluidized powder. As a rule of thumb, it is possible to assume a linear relationship between the electric and susceptibility (difference between the dielectric constants of the medium and of vacuum) and the packing density of the powder.

Irregularities in the geometry of the transmission path may cause serious disturbances in the reflection pattern. This can be avoided by mounting the electrode 7 close to the wall 9. With this arrangement, the electric field is concentrated between the electrode 7 and the closest portions of the wall 9, where irregularities in the vessel 1 cannot influence the symmetry of the field. This also eliminates other sources of disturbance that may exist inside the vessel 1, such as metal tubes for pressure probes or thermocouples. Also, reducing the distance between the electrode 7 and the grounded wall 9 decreases the specific impedance of the transmission path, which in turn results in a stronger contrast of the TDR signals.

A short connection from the coaxial cable 5 to the vessel 1 is desirable. Commercially available coaxial connectors (BNC, N-series, etc.) may be used.

Figure 4:
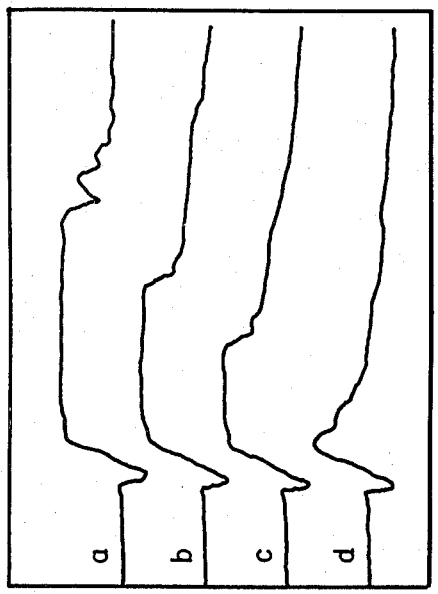
FIG. 4 shows an oscilliscope display for various levels of the char.
Figure 3:
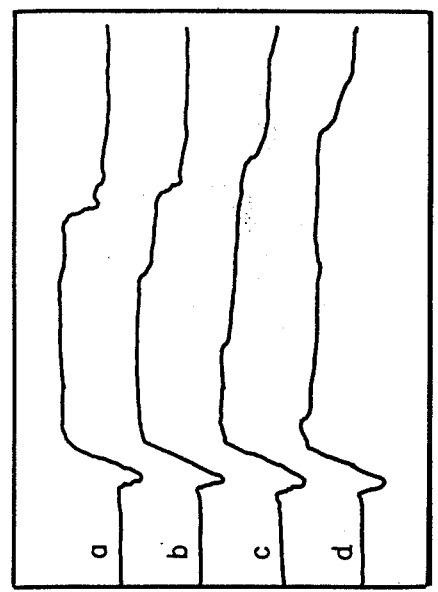
FIG. 3 shows an oscilliscope display for various levels of a bed comprising coal.

One embodiment of the invention shown in FIG. 1, comprised a metal wall 9 made from the copper pipe (I.D. 38 mm). The bottom end 13 of the electrode 7 was connected to ground with a 50 ohm resistor 15. This assembly was slowly filled with granulated materials. FIG. 3 and 4 show oscilloscope displays of the TDR Unit 2 during various filling stages with coal (50 × 100 mesh) and char (30 × 50 mesh). The presence of the termination resistor 15 determines the type of reflection at the end of the probe as can be readily observed by comparing FIGS. 3 and 4 with FIGS. 2 and 8.

The top curves (a) in FIGS. 3 and 4 represent the empty container. The beginning of the trace at the left margin is the image of the connecting coaxial cable 5 from the TDR unit 2. The first strong distortion of the trace is caused by entry of the signal into the copper container. Small oscillations superimposed on the horizontal trace are probably due to multiple reflections caused by BNC connector 12.

A definite downward step of the trace occurs when the pulse is partially reflected by the bed surface. This step can be seen approximately in the center of FIGS. 3 and 4, especially for the second and third traces b and c. The distance between the first discontinuity and this step corresponds to the interval $t_2$ in FIG. 2.

In the case of the coal bed, the signal remains at the lower value until it reaches the point of reflection from the bottom of the container. This value indicates a decrease in the specific impedance because the dielectric constant of the powdered coal is about twice that of air. The dielectric constant also influences the propagation velocity. This becomes evident from the displacement of the image of the bottom reflection to the right as the test pipe is filled.

With char as the bed material, the signal dissipates quickly after it enters the bed, and a reflection at the bottom of the container is not observed. This is due to the conductivity of the material.

Figure 5:
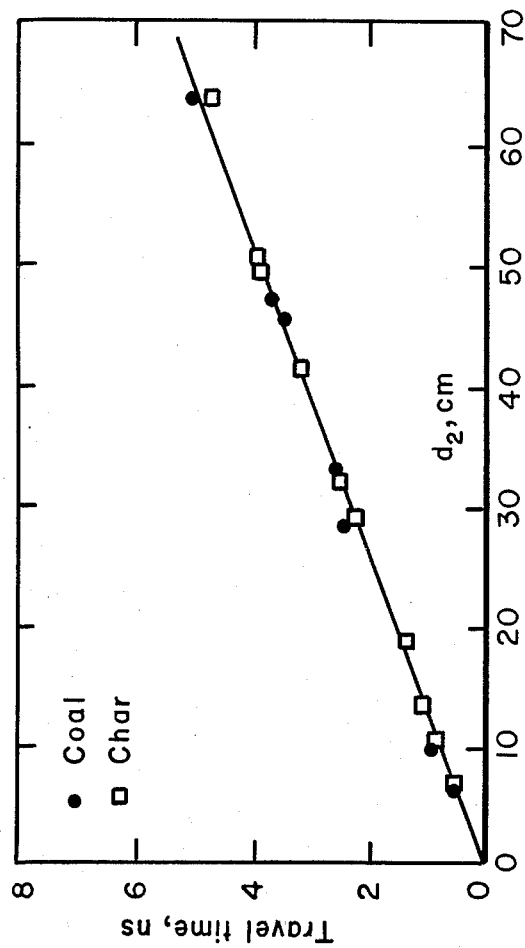
FIG. 5 shows measured travel time at different bed levels.

FIG. 5 shows the linear relationship between the values of $t_2$ in the TDR traces and the actual length of the air space between the bed material 11 level and the top of the pipe.

Figure 7:
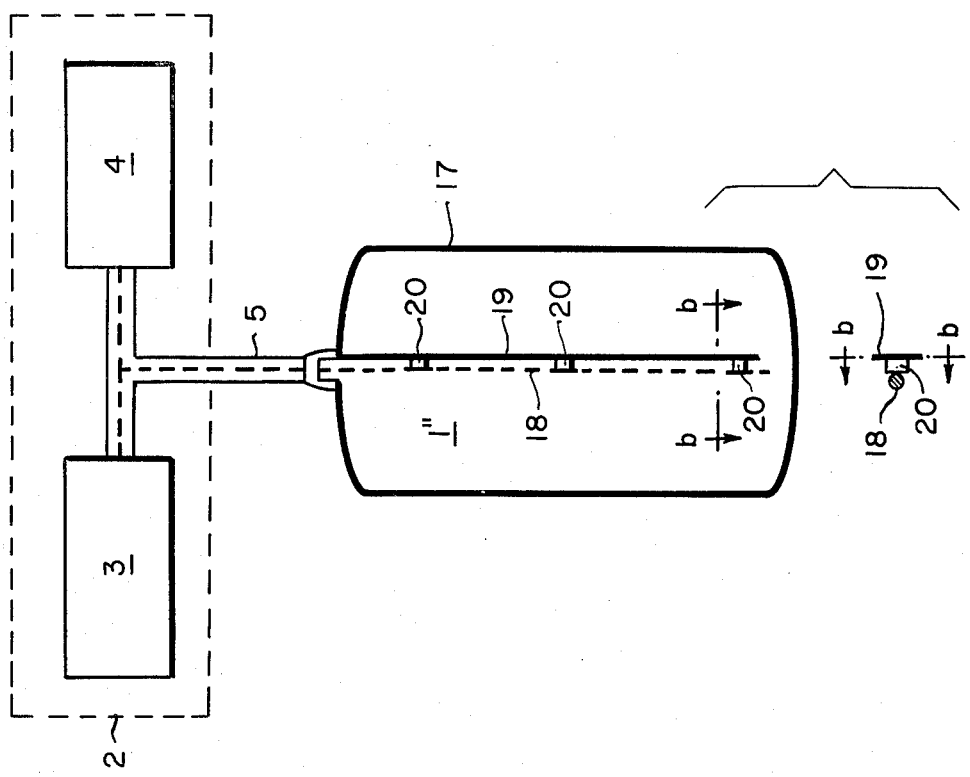
FIG. 7 comprises a generalized, schematic sketch for a vessel made from nonconducting material.
Figure 6:
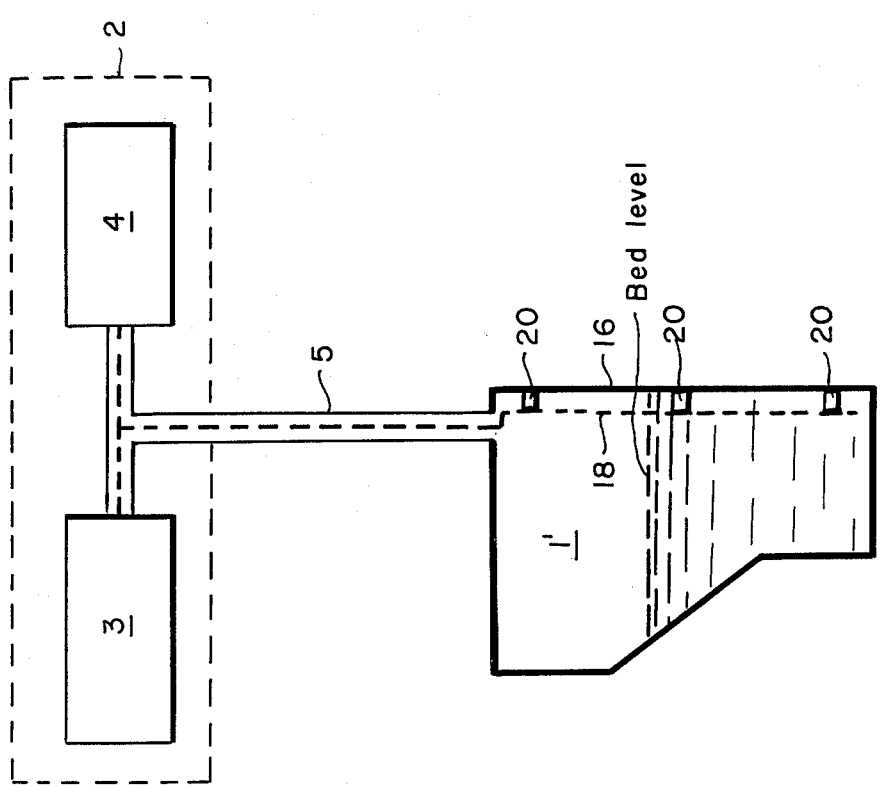
FIG. 6 comprises a generalized diagrammatic flowsheet for a vessel with an irregular cross section.

FIG. 6 illustrates an embodiment of this invention wherein the vessel 1¹ comprises a non-symmetrical wall 16. FIG. 7 illustrates an embodiment of this invention wherein the vessel 1¹¹ comprises a non-conducting wall 17. It has been found that if the geometry of the fluid bed reactor 1 deviates appreciably from a cylindrical shape (i.e. if the cross section changes rapidly with height), it is preferable to mount the electrode 18 in close proximity to the wall 16. This arrangement causes a concentration of the electric field between the electrode 18 and the wall 16, thereby restoring the effect of a cylindrical field. It has also been found that in some instances it may not be possible to use the walls of the vessel as the grounded conductor, e.g., if the vessel is too irregular or if the vessel is not made of conducting material. FIG. 7 illustrates a cross section of an alternative probe configuration which may be used. The wire 18 is similar to the pulse carrying insulated electrode illustrated by electrode 7 in FIG. 1. A grounded, flat plate 19, located in close proximity to the wire 18 is substituted for the wall 9 previously described. The electric field generated by the pulse generator 3 is concentrated between the wire 18 and the plate 19. Spacers 20 fabricated from isolating material are provided to maintain the wire 18 and the plate 19 at a constant distance. It is not necessary that both electrodes are in the interior of the vessel. One electrode, preferably the grounded one, may be mounted at the outside if the geometry of the vessel allows it.

Figure 8:
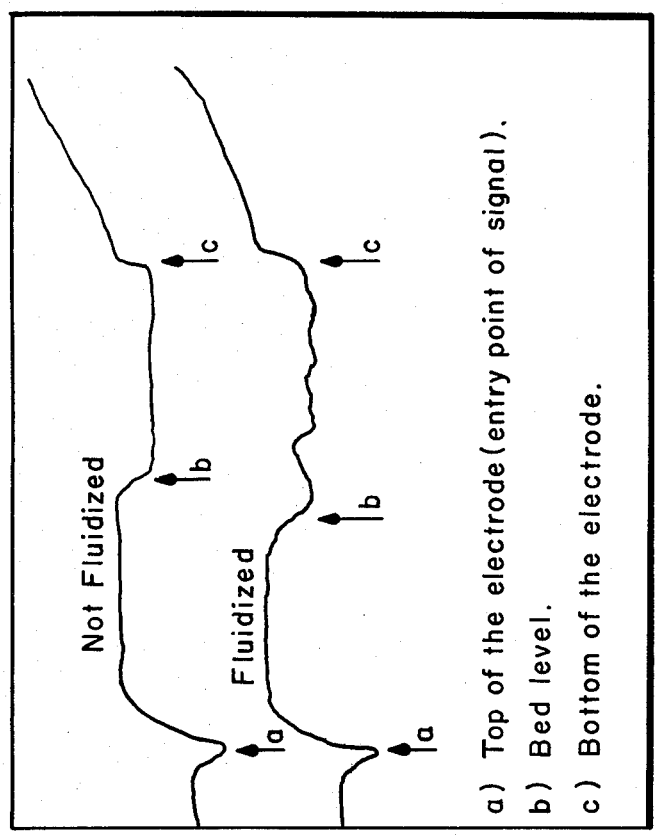
FIG. 8 shows schematic traces for fluid and non-fluid beds.

FIG. 8 illustrates the TDR traces for the nonfluid and fluidized beds. The irregularity of the trace portion representing the fluidized bed may be caused by gas bubbles in the bed. During one experiment, one could actually observe the formation and rise of bubbles on the TDR scope. It should also be noted that the signal was not attenuated by the char bed because the bed was insulated from the grounded shell by the plastic (non-conducting) wall 17. In this example, only dielectric losses, which apparently are not significant, would contribute to a signal attenuation.

Various modifications can be made to the invention as shown by those skilled in the art.

I claim:
1. A system for sensing the fluid level of a fluid bed reactor, said reactor including a reactor vessel in which the fluid bed is contained comprising an electrically conducting wall of an irregular shape including at least one substantially straight, vertical side wall, said system comprising:
   an elongate electrode which is mounted within said vessel in contact with the fluid therein, and which cooperates with the wall of said vessel to form an electrical transmission line,
   means for applying electrical pulses to one end of said electrode so that an applied pulse is reflected at various levels of the fluid within the vessel,
   means for measuring the time period between an applied pulse and a reflected pulse,
   and means for mounting said electrode in close proximity to the substantially straight side wall of the vessel along the length thereof so as to concentrate the electric field between the electrode and the said side wall, said mounting means including a plurality of non-conduting spacers located along the length of said electrode for spacing said electrode from said side wall of said vessel.

2. A system for sensing the fluid level of a fluid bed reactor, said reactor including a reactor vessel in which the fluid bed is contained and said system comprising a first elongate electrode which is mounted within said vessel in contact with the fluid therein, a second elongate electrode which is mounted within said vessel in contact with the fluid therein and which cooperates with said first elongate electrode to form an electrical transmission line, said second electrode comprising an elongate flat plate, support means including a plurality of non-conducting spacers located along the length of said first and second electrodes for insulatingly supporting said first and second electrodes in substantially parallel relationship, means for grounding said second electrode, means for applying electrical pulses to one end of said first electrode so that an applied pulse is reflected at various levels of the fluid within the vessel, and means for measuring the time period between an applied pulse and a reflected pulse.

* * * * *